United States Patent
Li et al.

(10) Patent No.: US 12,556,728 B2
(45) Date of Patent: Feb. 17, 2026

(54) CABAC CONTEXT MODEL GROUPING

(71) Applicant: Tencent America LLC, Palo Alto, CA (US)

(72) Inventors: Guichun Li, San Jose, CA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/379,619

(22) Filed: Oct. 12, 2023

(65) Prior Publication Data
US 2024/0129507 A1 Apr. 18, 2024

Related U.S. Application Data

(60) Provisional application No. 63/416,449, filed on Oct. 14, 2022.

(51) Int. Cl.
| | |
|---|---|
| H04N 19/00 | (2014.01) |
| H04N 19/13 | (2014.01) |
| H04N 19/176 | (2014.01) |
| H04N 19/44 | (2014.01) |
| H04N 19/70 | (2014.01) |

(52) U.S. Cl.
CPC ............ *H04N 19/44* (2014.11); *H04N 19/13* (2014.11); *H04N 19/176* (2014.11); *H04N 19/70* (2014.11)

(58) Field of Classification Search
CPC ...... H04N 19/44; H04N 19/13; H04N 19/176; H04N 19/70
See application file for complete search history.

(56) References Cited

U.S. PATENT DOCUMENTS

| | | | | |
|---|---|---|---|---|
| 10,127,913 | B1* | 11/2018 | Mokrushin | ............ H04N 19/91 |
| 2014/0072041 | A1* | 3/2014 | Seregin | .................. H04N 19/30 |
| | | | | 375/240.13 |
| 2015/0334425 | A1* | 11/2015 | He | ........................ H04N 19/174 |
| | | | | 375/240.03 |
| 2018/0324463 | A1* | 11/2018 | Zhang | ................... H04N 19/625 |
| 2021/0014480 | A1* | 1/2021 | George | ............... H04N 19/105 |
| 2021/0392331 | A1* | 12/2021 | Pfaff | .................... H04N 19/176 |

OTHER PUBLICATIONS

International Search Report and Written Opinion issued in International Application No. PCT/US2023/076859, mailed Feb. 21, 2024, 15 pages.

* cited by examiner

*Primary Examiner* — Zhihan Zhou
(74) *Attorney, Agent, or Firm* — ArentFox Schiff LLP

(57) ABSTRACT

A video bitstream comprising a current block in a current picture is received. A plurality of groups of context models associated with coding parameter values used to code the current picture is determined. Each group of the plurality of groups of context models is grouped based on one or more of the coding parameter values. A group of context models for the current block is determined from the plurality of groups of context models according to at least one of the coding parameter values associated with the current block. Initial context states are determined for context models belonging to the determined group of context models. The current block is reconstructed based on the determined initial context states of the group of context models.

20 Claims, 7 Drawing Sheets

CABAC CONTEXT MODEL GROUPING

INCORPORATION BY REFERENCE

The present application claims the benefit of priority to U.S. Provisional Application No. 63/416,449, "CABAC Context Model Grouping" filed on Oct. 14, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry.

According to an aspect of the disclosure, a method of video decoding is provided. In the method, a video bitstream comprising a current block in a current picture is received. A plurality of groups of context models associated with coding parameter values used to code the current picture is determined. Each group of the plurality of groups of context models is grouped based on one or more of the coding parameter values. A group of context models for the current block is determined from the plurality of groups of context models according to at least one of the coding parameter values associated with the current block. Initial context states are determined for context models belonging to the determined group of context models. The current block is reconstructed based on the determined initial context states of the group of context models.

In an aspect, the coding parameter values include at least one of a first coding parameter value indicating a temporal layer, a second coding parameter value indicating a slice type, or a third coding parameter value indicating a quantization parameter (QP) value.

In an example, for each group of the plurality of groups of context models, context states for the respective group of the plurality of groups of context models are initialized. The context states for the respective group of the plurality of groups of context models are further updated based on the initialized context states.

In an example, a first group of context models is determined based on at least one of a first temporal layer, a first slice type, or a first QP value. A second group of context models is determined based on at least one of a second temporal layer, a second slice type, or a second QP value.

In an example, a first initial context state of a first context model of the determined group of context models is determined. A second initial context state of a second context model of the determined group of context models is determined based on the determined first initial context state of the first context model.

In an example, the initial context states of the determined group of context models are determined based on another group of the plurality of groups of context models, where the other group is indicated by coding information in the received video bitstream.

In an example, the initial context states of the determined group of context models for the current block are determined based on predefined values that are indicated by coding information in the received video bitstream in one of a slice level, a picture level, and a sequence level.

In an example, the group of context models is determined based on at least one of a temporal layer, a slice type, or a QP value that is indicated by the at least one of the coding parameter values of the current block.

In an example, a plurality of sets of candidate initial context states is determined for the determined group of context models. A set of the candidate initial context states from the plurality of sets of candidate initial context states is determined as the initial context states for the determined group of context models based on coding information in the video bitstream.

In an example, the determined set of plurality of candidate initial context states includes one of (i) predefined initial context states and (ii) context states associated with a block in a picture prior to the current picture.

In an example, syntax elements associated with the current block are grouped into a plurality of sets of syntax elements. Context models associated with each set of the plurality of sets of syntax elements are determined from the group of context models. Initial context states for the context models associated with each set of the plurality of sets of syntax elements are determined based on a respective block in a picture prior to the current picture.

According to another aspect of the disclosure, an apparatus is provided. The apparatus includes processing circuitry. The processing circuitry can be configured to perform any of the described methods for video decoding/encoding. For example, the processing circuitry is configured to receive a video bitstream comprising a current block in a current picture. The processing circuitry is configured to determine a plurality of groups of context models associated with coding parameter values used to code the current picture. Each group of the plurality of groups of context models is grouped based on one or more of the coding parameter values. The processing circuitry is configured to determine a group of context models for the current block from a plurality of groups of context models according to at least one of the coding parameter values associated with the current block. The processing circuitry is configured to determine initial context states for context models belonging to the determined group of context models. The processing circuitry is configured to reconstruct the current block based on the determined initial context states of the group of context models.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
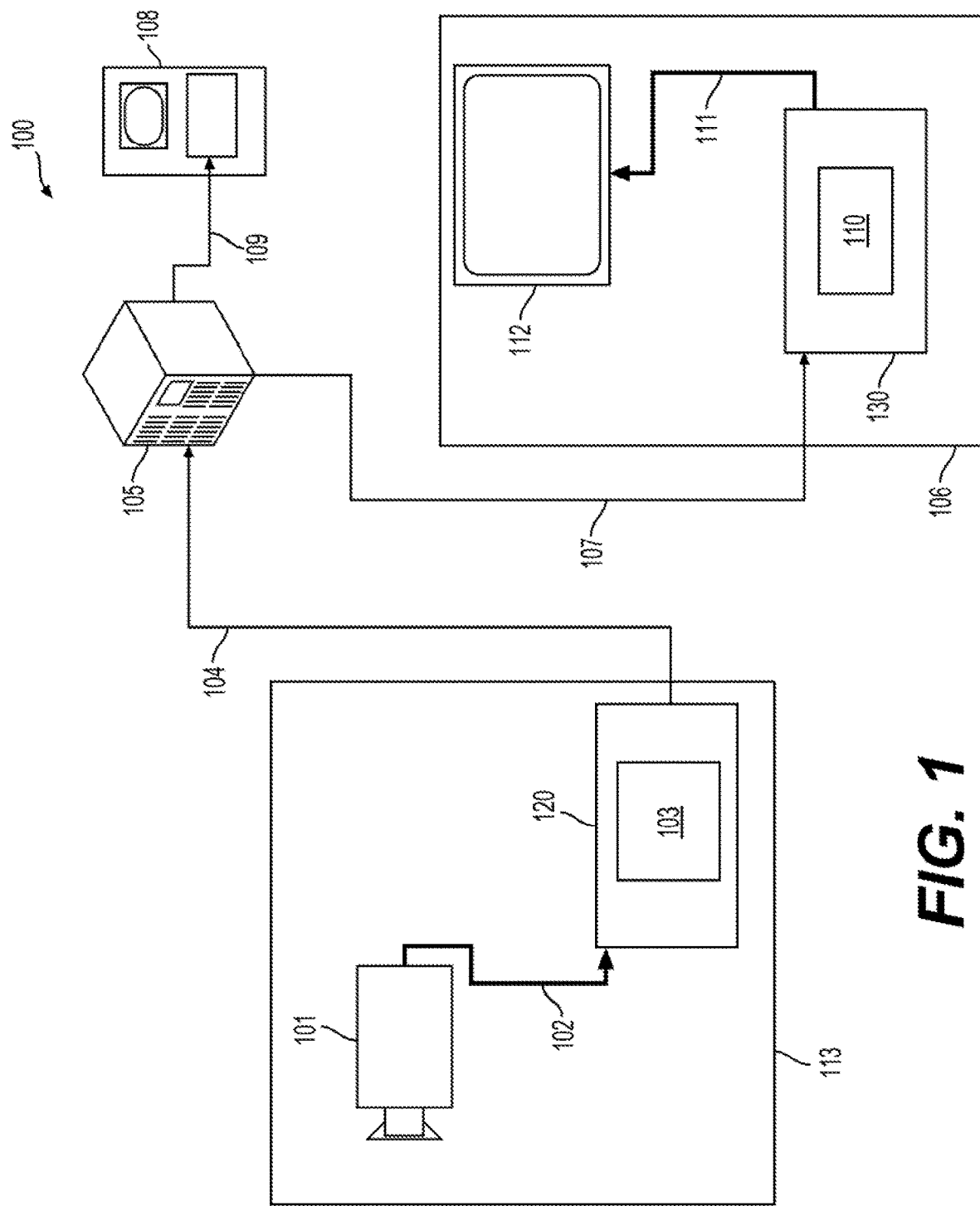
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
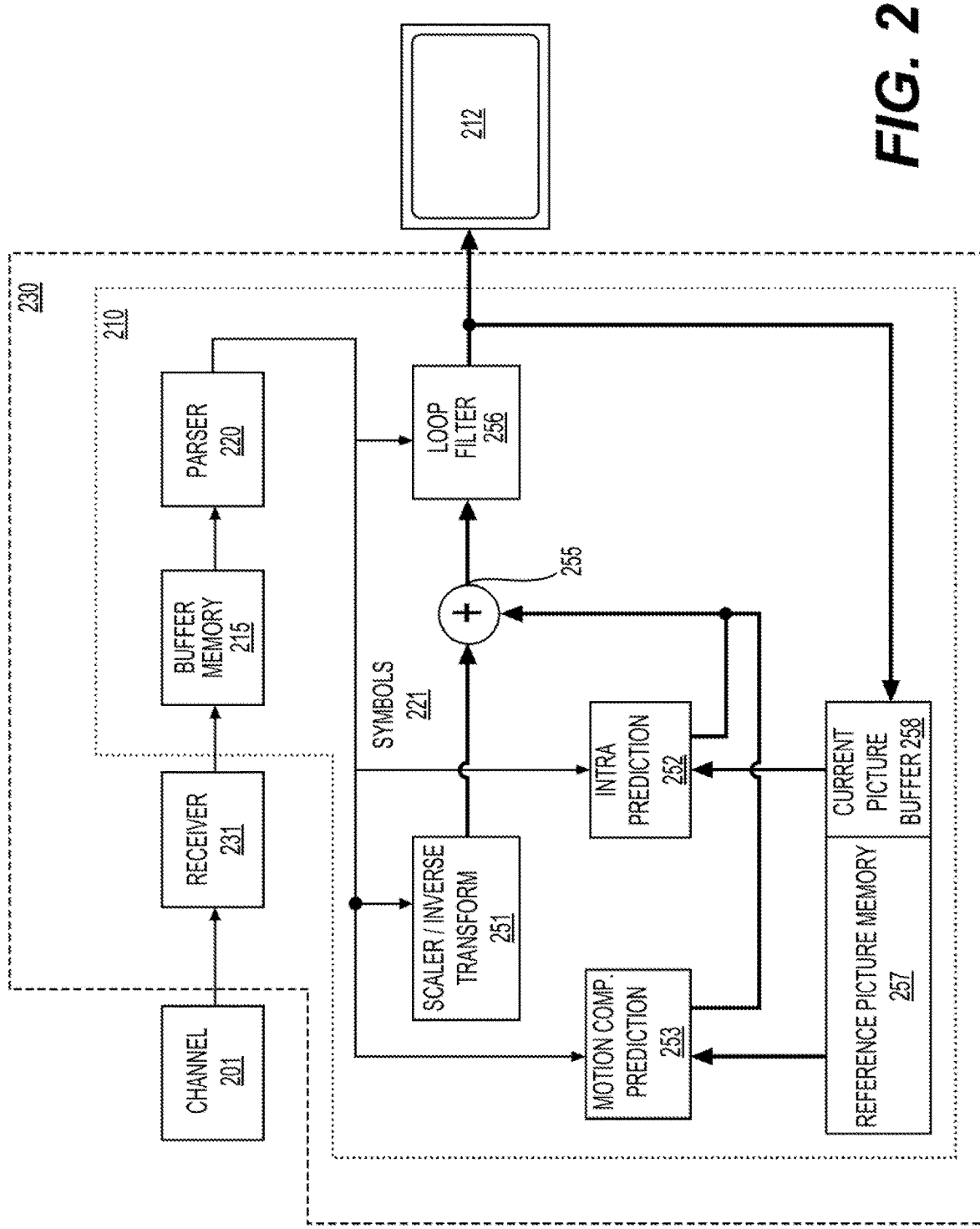
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
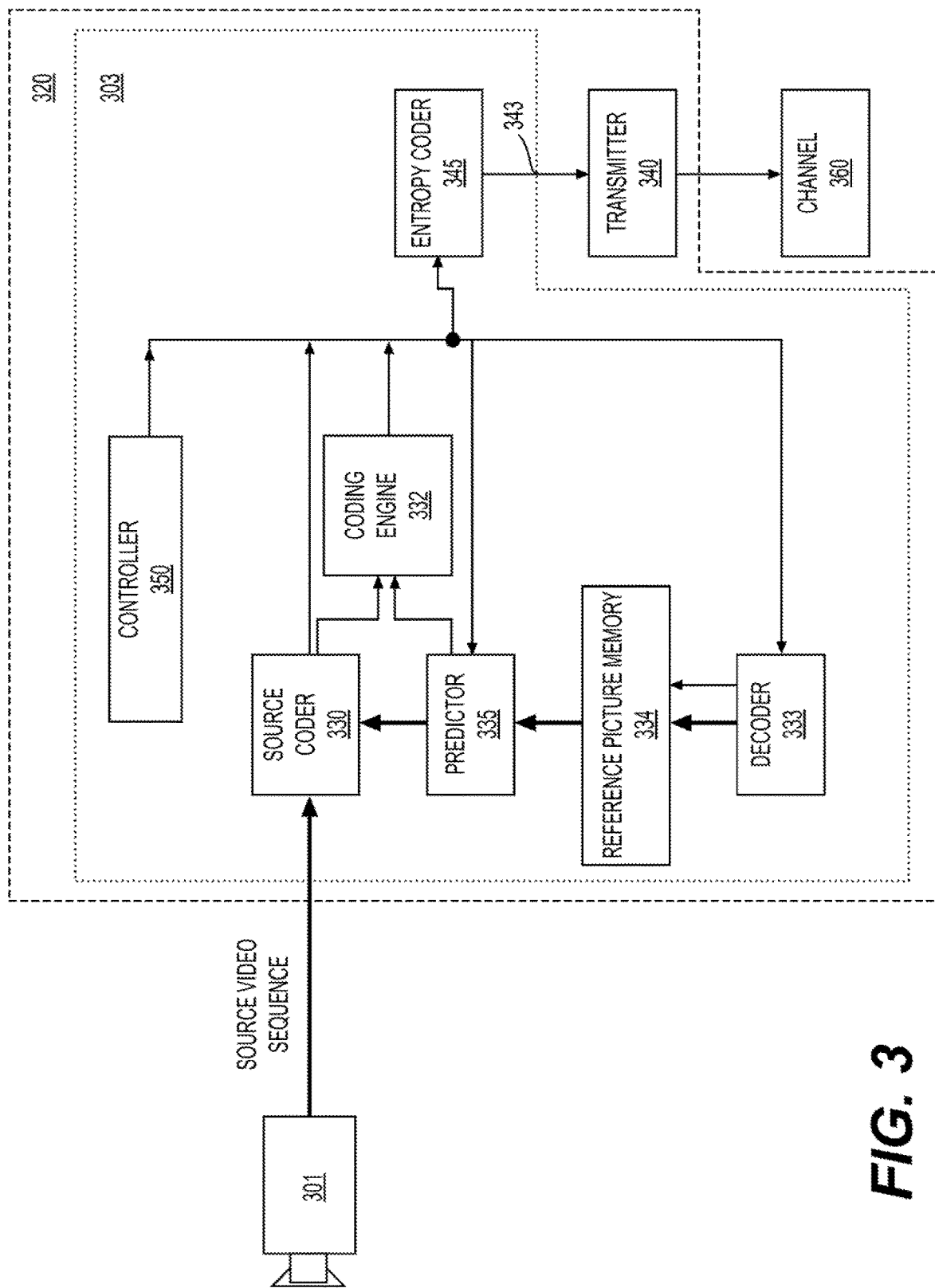
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to context-adaptive binary arithmetic coding (CABAC) initialization and inheritance. For example, multiple groups of CABAC initializations or multiple groups of CABAC inheriting from previously coded pictures can be applied for entropy coding.

A CABAC engine, such as in HEVC, can use a table-based probability transition process between 64 different representative probability states. In HEVC, a current interval range (e.g., ivlCurrRange) representing a state of the coding engine can be quantized to a set of 4 values prior to a calculation of a new interval range. The HEVC state transition can be implemented using a table containing all 64×4 8-bit pre-computed values to approximate the values of ivlCurrRange*pLPS(pStateIdx), where pLPS is a probability of a least probable symbol (LPS) and pStateIdx is an index of the current state. Also, a decode decision can be implemented using a pre-computed look up table (LUT). For example, a LPS range (e.g., ivlLpsRange) can be determined based on the LUT as follows in equation (1). The LPS range (e.g., ivlLpsRange) can further be used to update the current interval range (e.g., ivlCurrRange) and calculate an output bin value (e.g., binVal).

$$\text{ivlLpsRange} = \text{rangeTabLps}[p\text{StateIdx}][q\text{RangeIdx}] \quad \text{Eq. (1)}$$

The probability, for example in VVC, can be linearly expressed by a probability index pStateIdx. Therefore, all the calculation can be conducted with equations without LUT operation. To improve the accuracy of the probability estimation, a multi-hypothesis probability update model can be applied. The pStateIdx used in an interval subdivision of a binary arithmetic coder can be a combination of two probabilities pStateIdx0 and pStateIdx1. The two probabilities can be associated with each context model of the CABAC and can further be updated independently with different adaptation rates. The adaptation rates of pStateIdx0 and pStateIdx1 for each context model can be pre-trained based on statistics of associated bins. A probability estimate of pStateIdx can be an average of estimates from the two hypotheses (e.g., pStateIdx0 and pStateIdx)).

Figure 4:
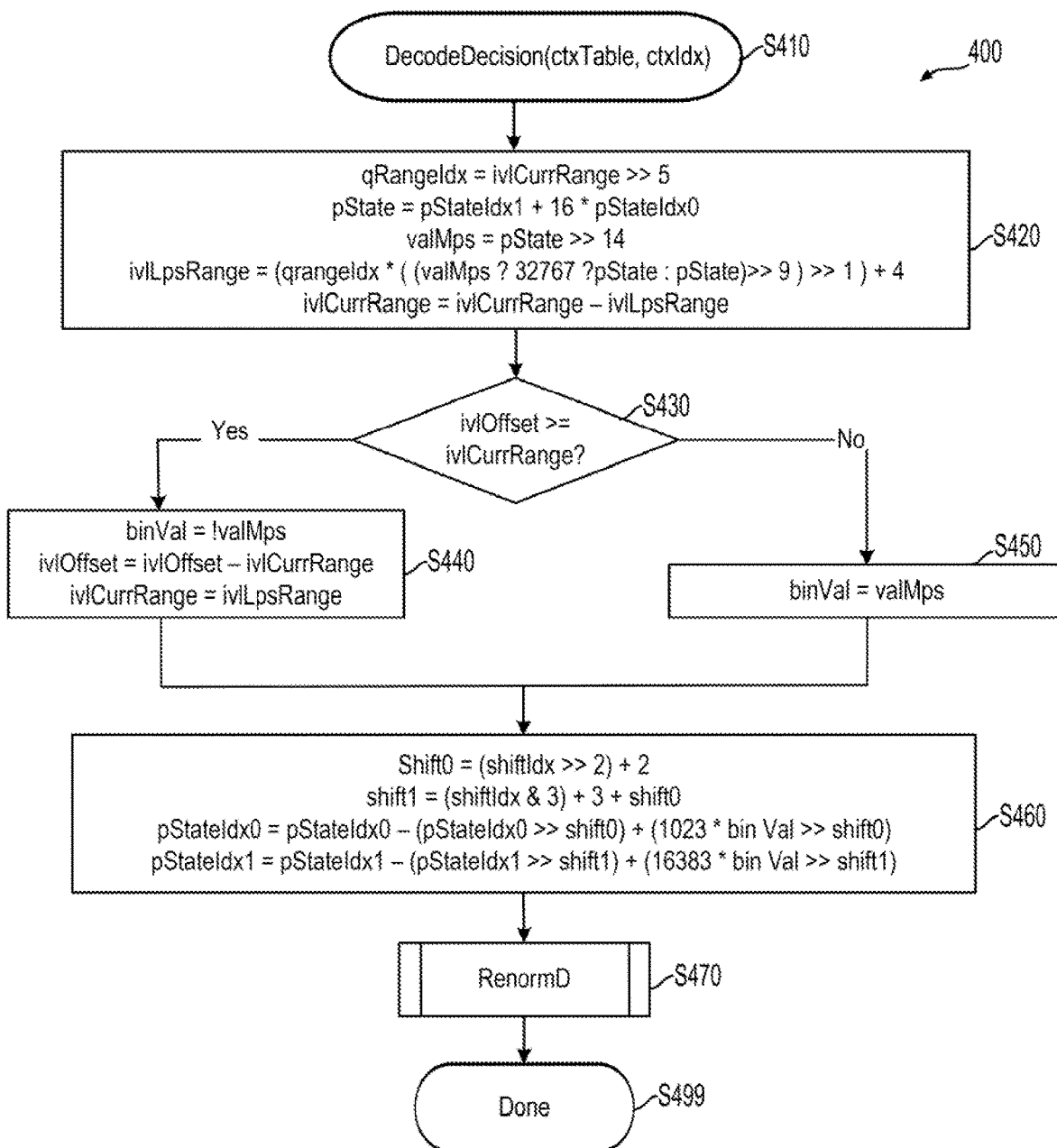
FIG. 4 is an exemplary flow chart of a bin decoding.

FIG. 4 shows an exemplary flowchart (400) for decoding a single binary decision (e.g., decoding a bin) in VVC. As shown in flowchart (400), at (S410), input variables of a context table (e.g., ctxTable) and a context index (e.g., ctxIdx) can be received. In some embodiments, the input variables can also include a current interval range (e.g., ivlCurrRange) and an interval offset (e.g., ivlOffset). At (S420), variables of a quantize range index (e.g., qRangeIdx), a probability state (e.g., pState), a value of a most probable symbol (e.g., valMps), and a least probable symbol interval range (e.g., ivlLpsRange) can be determined, and ivlCurrRange can be updated as ivlCurrRange-ivlLpsRange. At (S430), when ivlOffset is smaller than ivlCurrRange, as shown in (S450), a bin value (e.g., binVal) can be determined as valMps. When ivlOffset is equal to or larger than ivlCurrRange, as shown in (S440), the bin value (e.g., binVal) can be determined as 1-valMps, ivlOffset can be decremented by ivlCurrRange, and ivlCurrRange can be set equal to ivlLpsRange. At (S460), pStateIdx0 and pStateIdx0 can be updated based on parameters of shift0, shift1, and the bin value. At (S370), renormalization processing in decoder (e.g., RenormD) can be performed based on the determined pStateIdx0 and pStateIdx0.

Similar to HEVC, VVC CABAC can also have a quantization parameter (QP) dependent initialization process invoked at the beginning of each slice. Given an initial value of a luma QP for a slice, an initial probability state of a context model, denoted as preCtxState, can be derived as follows in equations (2)-(4)

$$m = \text{slopeIdx} \times 5 - 45 \quad \text{Eq. (2)}$$

$$n = (\text{offsetIdx} << 3) + 7 \quad \text{Eq. (3)}$$

$$\text{preCtxState} = \text{Clip3}(1, 127, ((m \times (QP-32)) >> 4) + n) \quad \text{Eq. (4)}$$

where slopeIdx and offsetIdx can be restricted to 3 bits, and total initialization values are represented by 6-bit precision. The initial probability state of the context model preCtxState represents the probability in the linear domain directly. Thus, preCtxState may only need proper shifting operations before it is input to the arithmetic coding engine (e.g., CABAC). According, a logarithmic to linear domain mapping as well as a 256-byte table can be saved (or skipped). The pStateIdx0 and pStateIdx1 can further be determined based on the preCtxState as follows in equations (5) and (6):

$$p\text{StateIdx0} = \text{preCtxState} << 3 \quad \text{Eq. (5)}$$

$$p\text{StateIdx1} = \text{preCtxState} << 7 \quad \text{Eq. (6)}$$

To further improve CABAC efficiency, an inherited context initialization method can be included, for example in ECM software. For example, context states of all context models in an inter slice (e.g., a B type slice or a P type slice) that contains a last CTU in a corresponding picture can be stored. The stored context states can be used to initialize the context models in a next inter slice that has a same slice type, a same QP value, and a same temporal layer ID.

For each inter slice, a control flag can be signaled to select a context initialization scheme used for the inter slice. When the flag is equal to zero, the context models of the slice can be initialized using one of a plurality of existing context initialization tables based on a flag, such as sh_cabac_init_flag. Otherwise, the context models of the slice can be initialized by inheriting context states of slices from a previously coded picture.

Although the related methods described above can improve coding efficiency, the related methods may break a frame level parallelism, such as a frame parallel processing (FPP) in both an encoder and a decoder, because the related methods may introduce a dependency between frames at a same temporal level.

In addition, when a temporal inheritance for CABAC state is used, initial context models may not be optimal for all cases. For example, for each temporal layer, better initial CABAC states may be available to improve coding efficiency.

In the disclosure, multiple (or a plurality of) candidate context models can be applied for entropy coding syntax elements. Each candidate context model can provide respective estimates of conditional probabilities of to-be-coded syntax elements. An exemplary context model can be a CABAC context model. The CABAC context model can be a probability model for one or more bins of a binarized syntax element. The CABAC context can be chosen from a selection of available models depending on statistics of recently coded syntax elements. The CABAC context model can store a probability of each bin being "1" or "0".

In the disclosure, multiple groups of context models, such as CABAC context models, can be applied for the entropy coding module. For example, a plurality of context models (e.g., CABAC context models) can be divided into a plurality of groups of context models according to predefined criteria, such as coding parameter values. Context states (e.g., probability of LPS pStateIdx and value of MPS valMPs) for each group of plurality of groups of context models can be initialized and updated respectively.

In an aspect, context models can be grouped based on one or more of criteria of CABAC inheritance (or coding parameter values), such as one or a combination of a temporal layer, a quantization parameter (QP), a slice type, etc. For simplicity and clarity, a temporal layer can be used as an example of the criteria, or the coding parameter value, in subsequent descriptions.

In an example, context models can be grouped into a plurality of groups of context models based on coding parameter values. Each group of the plurality of groups of context models can be grouped based on one or more of the coding parameter values. In an example, a group of context models for a current block can be determined from the plurality of groups of context models according to at least one of the coding parameter values associated with the current block. The coding parameter values can include at least one of a first coding parameter value indicating a temporal layer (e.g., temporal layer 0, temporal layer 1), a second coding parameter value indicating a slice type (e.g., I type, P type, or B type), or a third coding parameter value indicating a quantization parameter (QP) value.

In an example, a first group of context models can be determined based on at least one of a first temporal layer, a first slice type, or a first QP value. A second group of context models can be determined based on at least one of a second temporal layer, a second slice type, or a second QP value. For example, the first group of context models can be determined based on a first temporal layer (e.g., temporal layer 0), and the second group of context models can be determined based on a second temporal layer (e.g., temporal layer 1).

In an aspect, a separate set of initial context models can be applied for each group. A context state (e.g., probability of LPS pStateIdx and value of MPS valMPs) for each group can be initialized and updated independent of other groups.

In an example, for each group of the plurality of groups of context models, context states for the respective group of the plurality of groups of context models can be initialized. The context states for the respective group of the plurality of groups of context models can further be updated based on the initialized context states.

In an aspect, each temporal level (or temporal layer) can have respective initial context models. CABAC context states for the respective initial context models can be updated and inherited within the corresponding group for an entropy coding process.

For example, a first group of context models can be grouped based on a first temporal level (or first temporal layer). A second group of context models can be grouped based on a second temporal level (or second temporal layer). Context states of the context models of the first group can be initialized and updated within the first group. Context states of the context models of the second group can be initialized and updated within the second group.

In an example, a first initial context state of a first context model in the first group of context models can be determined. A second initial context state of a second context model of the first group of context models can be determined based on the determined first initial context state of the first context model.

In an aspect, CABAC state inheritance can be limited to within a same group of context models.

In an aspect, a source of CABAC state inheritance can be signaled to be chosen from one of the groups of context models.

In an example, initial context states of a group of context models can be determined based on another group of context models, where the other group is indicated by coding information in the received video bitstream.

In an example, the source of CABAC state inheritance can indicate a source block in a previous picture, such as a block in a middle of the previous picture or an end of the previous picture. Based on signal information, a source block in the previous picture can be selected from a plurality of candidate source blocks in the previous picture. Context states can be initialized based on the context states of the determined source block.

In an aspect, multiple sets of initial CABAC contexts can be available. When any context initialization process is necessary, one of the sets of initial context models can be selected.

In an aspect, a selection of initial CABAC contexts (or a selection of initialization values of CABAC context models) can be signaled in a bitstream, such as at a slice level (e.g., a slice header), a picture level (e.g., a picture parameter set (PPS) or a picture header), or a sequence level (e.g., a sequence parameter set (SPS)).

In an example, initial context states of a group of context models can be determined based on predefined values that are indicated by coding information, such as signaled in one of a slice level, a picture level, and a sequence level.

In an aspect, a selection of initial CABAC contexts can be determined by predefined criteria, such as one or a combination of a temporal layer, a slice type, a QP value, etc.

In an example, a group of context models is determined based on at least one of a temporal layer, a slice type, or a QP value.

In an aspect, a selection of whether to use one of the sets of context initialization or inheriting CABAC states can be signaled in a bitstream, such as at a slice level (e.g., a slice header), a picture level (e.g., a PPS or a picture header), or a sequence level (e.g., a SPS).

In an example, a flag can be signaled to indicate whether to use one of the sets of context initialization. The context initialization can indicate initial values (or initial context states) for the context models. The initial context states can include (i) hard coded values defined in a specification of a codec, such as VVC, or (ii) intermediate values of a block from a previous picture. The intermediate values can be called inheritance. Both the hard coded values and the intermediate values can be called initialization.

In an example, a plurality of sets of candidate initial context states can be determined for a group of context models. A set of the candidate initial context states from the plurality of sets of candidate initial context states can be determined as the initial context states for the group of context models based on coding information in the video bitstream.

In an example, the determined set of plurality of candidate initial context states includes one of (i) predefined initial context states and (ii) context states associated with a block in a picture prior to the current picture.

In an aspect, the syntaxes (e.g., syntaxes associated with a current block) can be grouped into different sets. All the syntaxes may be grouped into different sets. For each set, a source of CABAC state inheritance (including no CABAC state inheritance) can be selected (and/or signaled) differently.

In an example, syntax elements associated with the current block can be grouped into a plurality of sets of syntax elements. Context models associated with each set of the plurality of sets of syntax elements can be determined from the group of context models. Initial context states for the context models associated with each set of the plurality of sets of syntax elements can be determined based on a respective block in a picture prior to the current picture.

Figure 5:
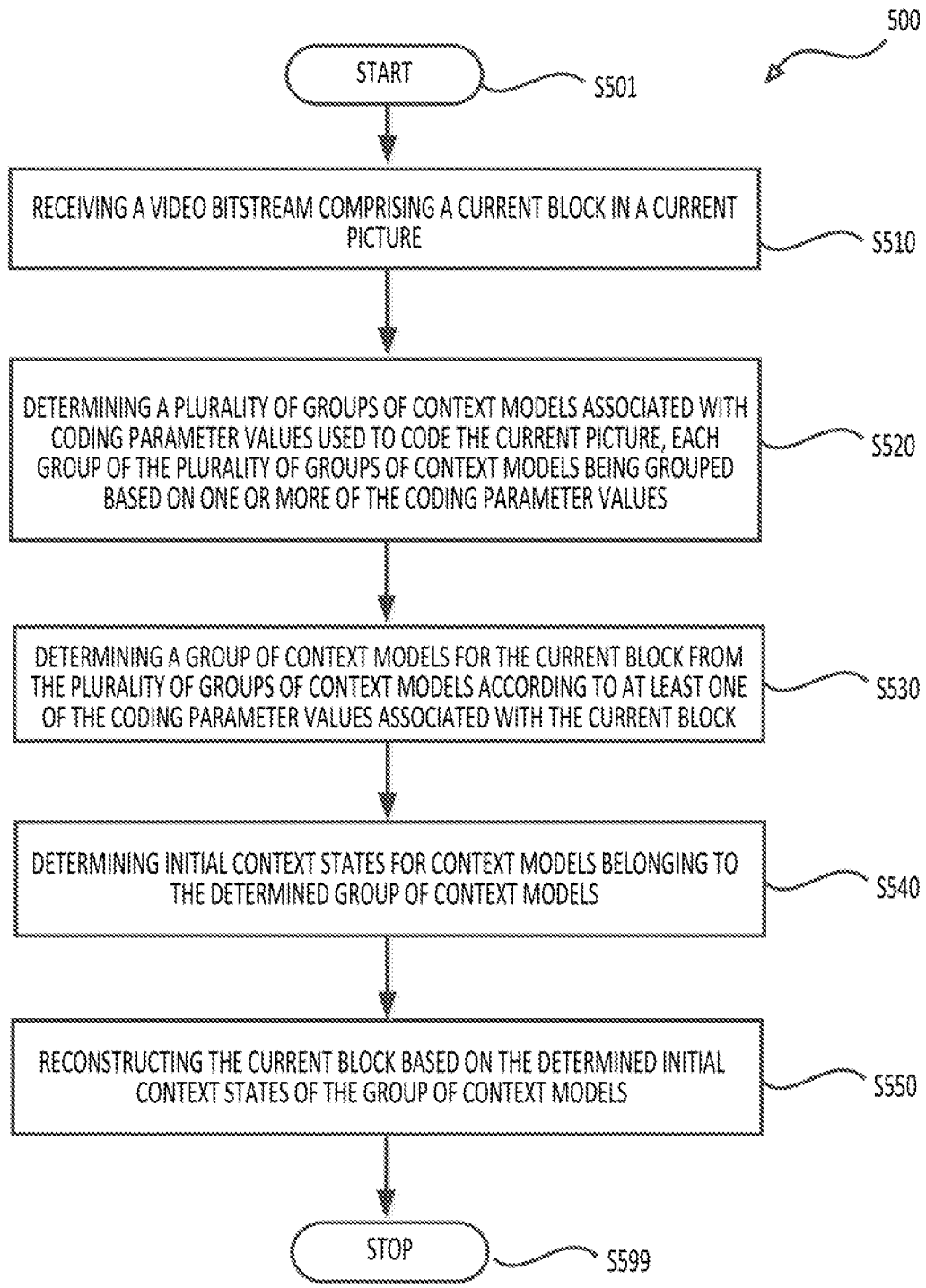
FIG. 5 shows a flow chart outlining a decoding process according to some embodiments of the disclosure.

FIG. 5 shows a flow chart outlining a process (500) according to an embodiment of the disclosure. The process (500) can be used in a video decoder. In various embodiments, the process (500) is executed by processing circuitry, such as the processing circuitry that performs functions of the video decoder (110), the processing circuitry that performs functions of the video decoder (210), and the like. In some embodiments, the process (500) is implemented in software instructions, thus when the processing circuitry executes the software instructions, the processing circuitry performs the process (500). The process starts at (S501) and proceeds to (S510).

At (S510), a video bitstream comprising a current block in a current picture is received.

At (S520), a plurality of groups of context models associated with coding parameter values used to code the current picture is determined. Each group of the plurality of groups of context models is grouped based on one or more of the coding parameter values.

At (S530), a group of context models for the current block is determined from the plurality of groups of context models according to at least one of the coding parameter values associated with the current block.

At (S540), initial context states are determined for context models belonging to the determined group of context models.

At (S550), the current block is reconstructed based on the determined initial context states of the group of context models.

In an aspect, the coding parameter values include at least one of a first coding parameter value indicating a temporal layer, a second coding parameter value indicating a slice type, or a third coding parameter value indicating a quantization parameter (QP) value.

In an example, for each group of the plurality of groups of context models, context states for the respective group of the plurality of groups of context models are initialized. The context states for the respective group of the plurality of groups of context models are further updated based on the initialized context states.

In an example, a first group of context models is determined based on at least one of a first temporal layer, a first slice type, or a first QP value. A second group of context models is determined based on at least one of a second temporal layer, a second slice type, or a second QP value.

In an example, a first initial context state of a first context model of the determined group of context models is determined. A second initial context state of a second context model of the determined group of context models is determined based on the determined first initial context state of the first context model.

In an example, the initial context states of the determined group of context models are determined based on another group of the plurality of groups of context models, where the other group is indicated by coding information in the received video bitstream.

In an example, the initial context states of the determined group of context models for the current block are determined based on predefined values that are indicated by coding information in the received video bitstream in one of a slice level, a picture level, and a sequence level.

In an example, the group of context models is determined based on at least one of a temporal layer, a slice type, or a QP value that is indicated by the at least one of the coding parameter values of the current block.

In an example, a plurality of sets of candidate initial context states is determined for the determined group of context models. A set of the candidate initial context states from the plurality of sets of candidate initial context states is determined as the initial context states for the determined group of context models based on coding information in the video bitstream.

In an example, the determined set of plurality of candidate initial context states includes one of (i) predefined initial context states and (ii) context states associated with a block in a picture prior to the current picture. In an example, syntax elements associated with the current block are grouped into a plurality of sets of syntax elements. Context models associated with each set of the plurality of sets of syntax elements are determined from the group of context models. Initial context states for the context models associated with each set of the plurality of sets of syntax elements are determined based on a respective block in a picture prior to the current picture.

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
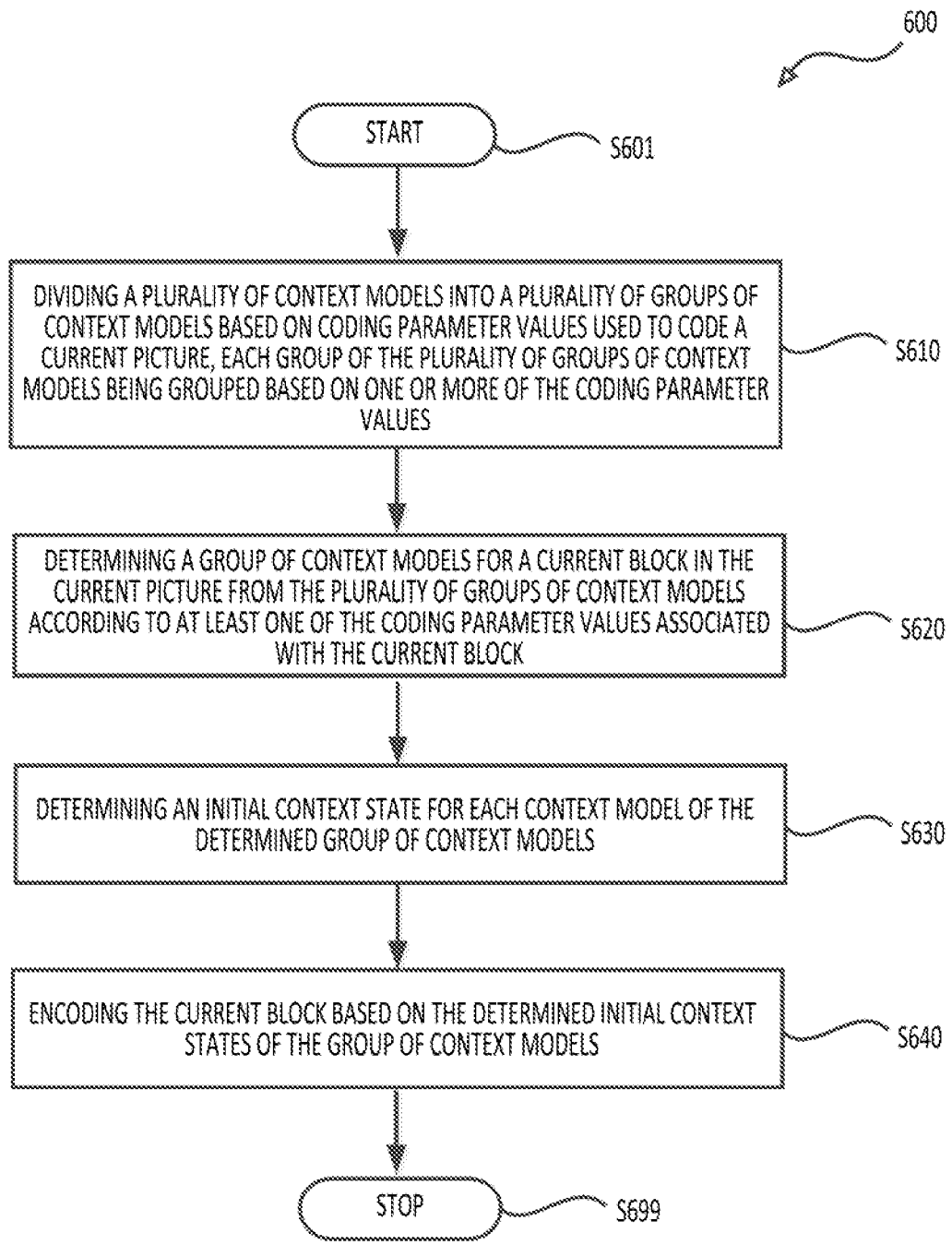
FIG. 6 shows a flow chart outlining an encoding process according to some embodiments of the disclosure.

FIG. 6 shows a flow chart outlining a process (600) according to an embodiment of the disclosure. The process (600) can be used in a video encoder. In various embodiments, the process (600) is executed by processing circuitry, such as the processing circuitry that performs functions of the video encoder (103), the processing circuitry that performs functions of the video encoder (303), and the like. In some embodiments, the process (600) is implemented in software instructions, thus when the processing circuitry executes the software instructions, the processing circuitry performs the process (600). The process starts at (S601) and proceeds to (S610).

At (S610), a plurality of context models is divided into a plurality of groups of context models based on coding parameter values used to code a current picture, where each group of the plurality of groups of context models is grouped based on one or more of the coding parameter values.

At (S620), a group of context models for a current block in the current picture is determined from the plurality of groups of context models according to at least one of the coding parameter values associated with the current block.

At (S630), an initial context state is determined for each context model of the determined group of context models.

At (S640), the current block is encoded based on the determined initial context states of the group of context models.

Then, the process proceeds to (S699) and terminates.

The process (600) can be suitably adapted. Step(s) in the process (600) can be modified and/or omitted. Additional step(s) can be added. Any suitable order of implementation can be used.

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
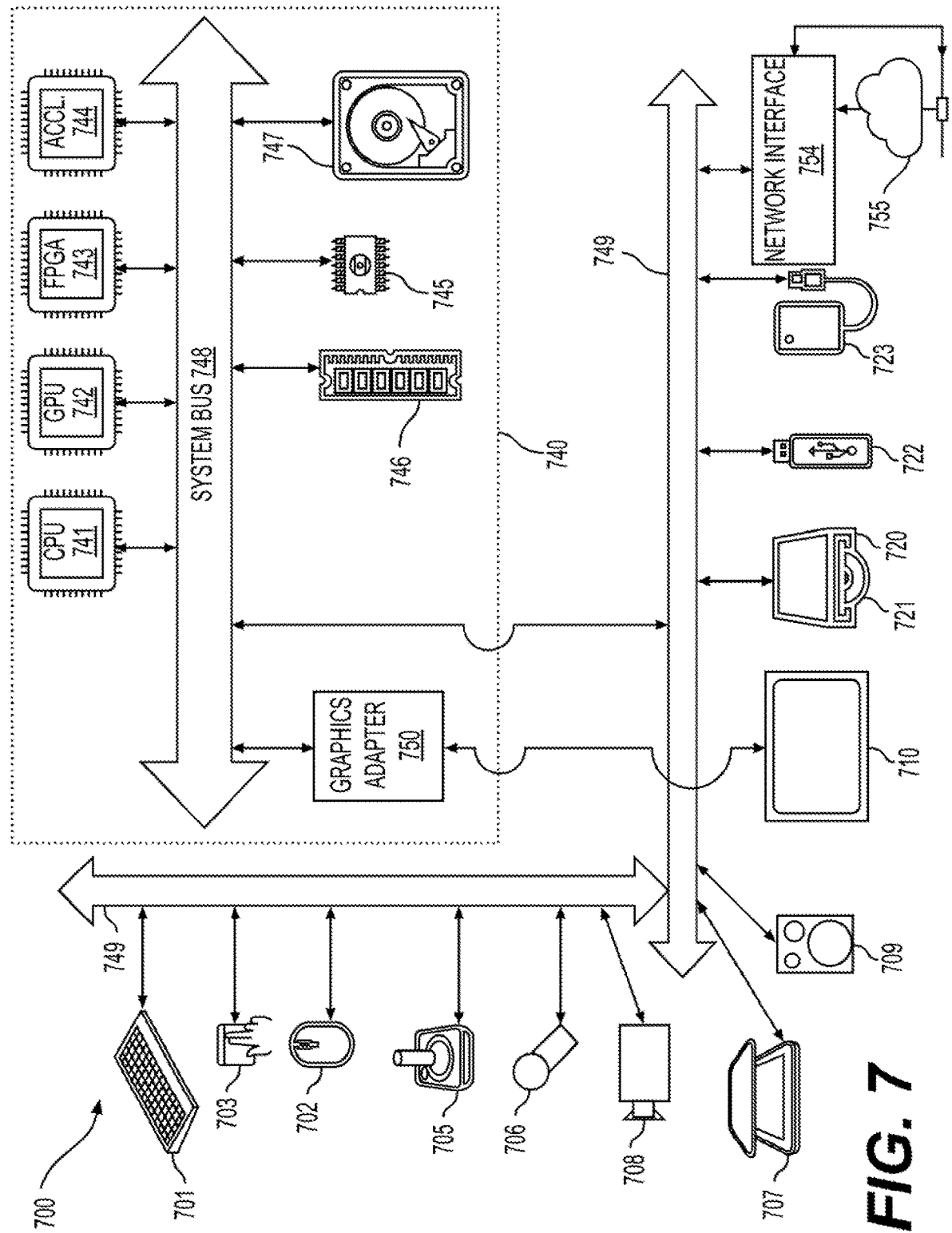
FIG. 7 is a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like)

executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
   receiving a video bitstream comprising a current block in a current picture;
   determining a plurality of groups of context models that is grouped based on coding parameter values used to code the current picture, each group of the plurality of groups of context models being grouped based on at least one of a respective temporal layer, a respective slice type, or a respective quantization parameter (QP) value included in the coding parameter values;
   determining a group of context models for the current block from the plurality of groups of context models according to at least one of the coding parameter values associated with the current block;
   determining initial context states from a plurality of sets of candidate initial context states for context models belonging to the determined group of context models, the plurality of sets of candidate initial context states including a set of initial context states associated with another group of the plurality of groups of context models, the other group of the plurality of groups of context models being indicated by coding information in the received video bitstream; and
   reconstructing the current block based on the determined initial context states of the group of context models.

2. The method of claim 1, wherein the coding parameter values include at least one of a first coding parameter value indicating a temporal layer, a second coding parameter value indicating a slice type, or a third coding parameter value indicating a QP value.

3. The method of claim 1, further comprising:
   for each group of the plurality of groups of context models,
      initializing context states for the respective group of the plurality of groups of context models; and
      updating the context states for the respective group of the plurality of groups of context models based on the initialized context states.

4. The method of claim 1, wherein the determining the plurality of groups of context models further comprises:
   determining (i) a first group of context models based on at least one of a first temporal layer, a first slice type, or a first QP value and (ii) a second group of context models based on at least one of a second temporal layer, a second slice type, or a second QP value.

5. The method of claim 1, wherein the determining the initial context states further comprises:
   determining a first initial context state of a first context model of the determined group of context models; and
   determining a second initial context state of a second context model of the determined group of context models based on the determined first initial context state of the first context model.

6. The method of claim 1, wherein the determining the initial context states further comprises:
   determining the initial context states of the determined group of context models for the current block based on predefined values that are indicated by the coding information in the received video bitstream in one of a slice level, a picture level, and a sequence level.

7. The method of claim 1, wherein the determining the group of context models for the current block further comprises:
   determining the group of context models based on at least one of a temporal layer, a slice type, or a QP value that is indicated by the at least one of the coding parameter values of the current block.

8. The method of claim 1, wherein the determining the initial context states further comprises:
   determining the plurality of sets of candidate initial context states for the determined group of context models; and
   determining a set of the candidate initial context states from the plurality of sets of candidate initial context states as the initial context states for the determined group of context models based on the coding information in the received video bitstream.

9. The method of claim 8, wherein the determined set of plurality of candidate initial context states includes one of (i) predefined initial context states and (ii) context states associated with a block in a picture prior to the current picture.

10. The method of claim 1, wherein:
    syntax elements associated with the current block are grouped into a plurality of sets of syntax elements; and the method further comprises:
    determining context models associated with each set of the plurality of sets of syntax elements from the group of context models; and
    determining initial context states for the context models associated with each set of the plurality of sets of syntax elements based on a different block in a picture prior to the current picture.

11. A method of video encoding, the method comprising:
    grouping a plurality of groups of context models associated with a current block in a current picture based on coding parameter values used to code the current picture, each group of the plurality of groups of context models being grouped based on at least one of a respective temporal layer, a respective slice type, or a respective quantization parameter (QP) value included in the coding parameter values;
    determining a group of context models for the current block from the plurality of groups of context models according to at least one of the coding parameter values associated with the current block;
    determining initial context states from a plurality of sets of candidate initial context states for context models belonging to the determined group of context models, the plurality of sets of candidate initial context states including a set of initial context states associated with another group of the plurality of groups of context models; and
    encoding the current block into a video bitstream based on the determined initial context states of the group of context models.

12. The method of claim 11, wherein the coding parameter values include at least one of a first coding parameter value indicating a temporal layer, a second coding parameter value indicating a slice type, or a third coding parameter value indicating a QP value.

13. The method of claim 11, further comprising:
    for each group of the plurality of groups of context models,
        initializing context states for the respective group of the plurality of groups of context models; and
        updating the context states for the respective group of the plurality of groups of context models based on the initialized context states.

14. The method of claim 11, wherein the grouping comprises:
    determining (i) a first group of context models based on at least one of a first temporal layer, a first slice type, or a first QP value and (ii) a second group of context models based on at least one of a second temporal layer, a second slice type, or a second QP value.

15. The method of claim 11, wherein the determining the initial context states further comprises:
    determining a first initial context state of a first context model of the determined group of context models; and
    determining a second initial context state of a second context model of the determined group of context models based on the determined first initial context state of the first context model.

16. The method of claim 11, wherein the determining the initial context states further comprises:
    determining the initial context states of the determined group of context models for the current block based on predefined values that are encoded into the video bitstream in one of a slice level, a picture level, and a sequence level.

17. The method of claim 11, wherein the determining the group of context models for the current block further comprises:
    determining the group of context models based on at least one of a temporal layer, a slice type, or a QP value that is indicated by the at least one of the coding parameter values of the current block.

18. The method of claim 11, wherein the determining the initial context states further comprises:
    determining the plurality of sets of candidate initial context states for the determined group of context models; and
    determining a set of the candidate initial context states from the plurality of sets of candidate initial context states as the initial context states for the determined group of context models.

19. The method of claim 18, wherein the determined set of plurality of candidate initial context states includes one of (i) predefined initial context states and (11) context states associated with a block in a picture prior to the current picture.

20. A non-transitory computer-readable storage medium storing instructions which, when executed by a processor, cause the processor to perform an encoding method comprising:
    grouping a plurality of groups of context models associated with a current block in a current picture based on coding parameter values used to code the current picture, each group of the plurality of groups of context models being grouped based on at least one of a respective temporal layer, a respective slice type, or a respective quantization parameter (QP) value included in the coding parameter values;
    determining a group of context models for the current block from the plurality of groups of context models according to at least one of the coding parameter values associated with the current block;
    determining initial context states from a plurality of sets of candidate initial context states for context models belonging to the determined group of context models, the plurality of sets of candidate initial context states including a set of initial context states associated with another group of the plurality of groups of context models;
    encoding the current block into a video bitstream based on the determined initial context states of the group of context models; and
    transmitting the encoded video bitstream.

* * * * *